United States Patent Office 3,117,102
Patented Jan. 7, 1964

3,117,102
PLASTICIZED POLYCARBONATES
Bernard F. Crowe, Maplewood, N.J., assignor to Air Reduction Company, Incorporated, New York, N.Y., a corporation of New York
No Drawing. Filed Nov. 29, 1960, Ser. No. 72,312
5 Claims. (Cl. 260—31.2)

This invention relates to new plasticized polycarbonates prepared from dihydroxy diphenyl alkanes and, as a plasticizer therefor, a liquid dicarbonate of a dihydroxy diphenyl alkane.

The polycarbonate resins which can be plasticized according to this invention can generally be represented by the following formula

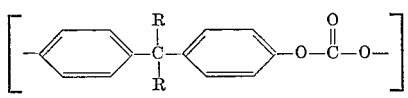

wherein R is selected from the group consisting of hydrogen, unbranched or branched aliphatic hydrocarbon residues up to about 10 carbon atoms, and cycloaliphatic residues and $n$ represents the number of repeating units in the molecule.

Polycarbonate resins prepared from dihydroxy diphenyl alkanes are well known in the art and can be prepared by known processes and will only be briefly described herein.

The dihydroxy diphenyl alkanes which can be used to form the ploycarbonate resins can be represented by the general formula

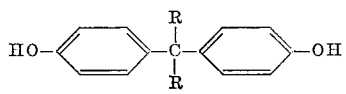

wherein R represents the same atoms or groups as described above. Some specific compounds coming within the scope of the above formula include 4,4'-dihydroxy-diphenyl methane; 4,4'-dihydroxy-diphenyl-1,1-ethane; 4,4' - dihydroxy-diphenyl-1,1-n-butane; 4,4'-dihydroxy-diphenyl - 1,1 - heptane; 4,4'-dihydroxy-diphenyl-1,1-cyclopentane; and 4,4'-dihydroxy-diphenyl-1,1-cyclohexane.

The molecular weight of the polycarbonate resins can vary quite widely depending upon the properties desired in the final product as well as its ultimate use. Generally, polycarbonates having a molecular weight represented by an intrinsic viscosity of above about 0.4 have more desirable properties especially for the formation of supported or unsupported films.

The conversion of the dihydroxy diphenyl alkanes into high molecular weight polycarbonates can be accomplished by reacting the dihydroxy diphenyl alkanes with derivatives of carbonic acid such as carbonic acid alkyl or aryl diesters, carbonic acid alkyl halo diesters, phosgene, bis-halocarbonic acid esters of dihydroxy diphenyl alkanes, and so forth, as will be understood by those skilled in the art.

One manner in which the polycarbonates can be prepared is by introducing phosgene into solutions of the dihydroxy diphenyl alkanes in organic bases such as dimethylaniline, diethylaniline, trimethylamine, and pyridine, or in an organic solvent such as benzene, xylene, methylene chloride, and so forth with the addition of an acid binding agent. A preferred process consists of introducing phosgene into an aqueous solution or suspension of an alkali metal salt of the dihydroxy diphenyl alkane in the presence of an excess of the alkali metal salt at about room temperature or below.

Another manner in which the polycarbonates can be prepared is by reacting, by ester radical interchange, a dihydroxy diphenyl alkane with a carbonic acid diester such as dimethyl, diethyl, dicyclohexyl, and diphenyl carbonic acid ester at elevated temperatures of about 120° C. and above. A more detailed description of such a process is set forth below as a working example using bis-phenol A and diphenyl carbonate as the reactants.

Films, supported or unsupported, cast or otherwise, prepared from such polycarbonate resins are generally quite brittle. Although various plasticizers have been used in the past in an attempt to render the polycarbonate resins more flexible and thus more useful, compatibility of the various plasticizers with the polycarbonate resins has been a problem of some importance.

I have found that the dicarbonate esters of dihydroxy diphenyl alkanes can be advantageously combined with and used to plasticize the polycarbonate resins prepared from dihydroxy diphenyl alkanes as herein described to produce a useful, highly flexible resin or film and that the dicarbonate esters of the dihydroxy diphenyl alkanes are very compatible and can be readily processed with such polycarbonate resins.

The dicarbonate esters of dihydroxy diphenyl alkanes which can be used to plasticize the polycarbonate resins according to this invention include those represented by the following general formula

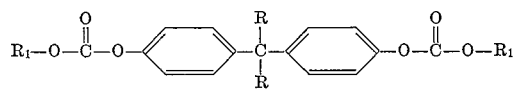

wherein R represents the same atoms or groups described above and $R_1$ represents a lower alkyl radical having no more than about 8 carbon atoms such as ethyl, butyl, ethylhexyl, or an aryl radical of the benzene series such as phenyl having no more than about 8 carbon atoms.

The dicarbonates of the dihydroxy diphenyl alkanes can be prepared by processes known to those skilled in the art, for example by reacting the corresponding dihydroxy diphenyl alkane with 2 molecular proportions of an aliphatic chloroformate. The reaction can be carried out in the presence of a basic material such as sodium hydroxide, potassium hydroxide, calcium carbonate, and so forth.

The dihydroxy diphenyl alkanes which can be used and reacted with the aliphatic chloroformates can be the same as those described above as suitable for forming the high molecular weight polycarbonate resins.

The aliphatic chloroformates can be represented by the following formula

wherein $R_1$ represents the same atoms or groups also described above.

Some examples of aliphatic chloroformates which can be used include methyl chloroformate, ethyl chloroformate, n-propyl chloroformate, n-butyl chloroformate, n-hexyl chloroformate, vinyl chloroformate, allyl chloroformate, methallyl chloroformate, and the like.

The dihydroxy diphenyl alkane dicarbonate esters are compatible with the polycarbonates in amounts in excess of 200 percent. The plasticized compositions can be prepared by simply admixing the same together, and the exact amount of plasticizer which can be employed can be varied quite widely depending upon the properties desired in the final product, as is well known to those skilled in the art.

The following example illustrates the preparation of the diethyl carbonate ester of 4,4'-dihydroxy-diphenyl-2,2-propane. All parts are by weight.

*Example 1.*—A solution of 136.8 parts (0.6 mol) of 4,4'-dihydroxy-diphenyl-2,2-propane (bis-phenol A), 137 parts (1.26 mols) of ethylchlorocarbonate, and 215 parts of diethyl ether was prepared and placed in a suitable reaction vessel. A solution of 55 parts of sodium hydroxide in 300 parts of water was then slowly added to the reaction mixture while maintaining the temperature of the reaction at about 5 to 10° C. After the reaction was complete the diethyl ether layer containing the product was separated from the aqueous layer and washed with 2% sodium hydroxide solution and then with water and dried over sodium sulfate. The ether was removed by heating the solution to about 100° C. at reduced pressure and the diethyl carbonate ester of 4,4'-dihydroxy-diphenyl-2,2-propane recovered in the form of an oily liquid which was insoluble in water.

The following example illustrates the preparation of a high molecular weight polycarbonate and the plasticizing of the resin so produced with a dicarbonate ester of a dihydroxy diphenyl alkane. All parts are by weight.

*Example 2.*—60.6 parts of 4,4'-dihydroxy-diphenyl-2,2-propane (bis-phenol A) were mixed with 62.4 parts of diphenyl carbonate together with 0.36 part of 2,6-ditertiary butyl paracresol and 0.06 part of sodium dithionite hydrosulfite ($Na_2S_2O_4$). The reaction mixture was heated to 180° C. at 55 mm. pressure and was maintained at this temperature and pressure for about 5½ hours. The temperature was then increased to about 200° C. and the pressure adjusted to about 1 mm. The temperature was then gradually increased and the reaction terminated at about 300° C. and 0.18 mm. The total reaction time was about 8 hours.

The bis-phenol polycarbonate resin was then recovered. The resin was a hard solid, insoluble in acetone and light tan in color, having an intrinsic viscosity of 0.42 and a melting point of 217–219° C.

A portion of the resin was then dissolved in tetrachloroethane and a film cast therefrom by conventional means. The film was observed to be clear but very hard and brittle.

Another portion of the polycarbonate resin produced according to this example was admixed with 2 parts diethyl carbonate ester of 4,4'-dihydroxy-diphenyl-2,2-propane to 1 part of the resin. The plasticizer was completely compatible with the resin. The resin-plasticizer mixture was then dissolved in tetrachloroethane and films cast therefrom by conventional means. The resulting films were very flexible. The plasticized film exhibiting good light and heat stability and no noticeable bleeding.

I claim:

1. A plasticized polycarbonate resin composition comprising a polycarbonate resin prepared from a dihydroxy diphenyl alkane having the formula

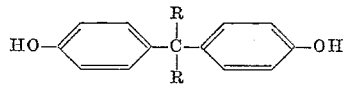

wherein R is selected from the group consisting of hydrogen, unbranched aliphatic hydrocarbon residues having up to about 10 carbon atoms, branched aliphatic hydrocarbon residues having up to about 10 carbon atoms, and cycloaliphatic residues having up to about 10 carbon atoms;

and a compound selected from the group consisting of carbonic acid alkyl di-esters, carbonic acid aryl di-esters, carbonic acid alkyl halo di-esters, phosgene, and bis-halocarbonic acid esters of dihydroxy diphenyl alkanes;

and an effective plasticizing amount of a di-carbonate ester of a dihydroxy diphenyl alkane plasticizer having the formula

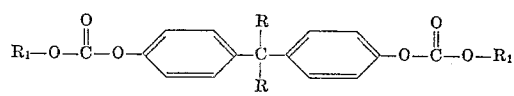

where R is said R above and $R_1$ is a radical selected from the group consisting of ethyl, butyl, ethylhexyl, and phenyl.

2. A plasticized film comprising a polycarbonate resin prepared from a dihydroxy diphenyl alkane having the formula

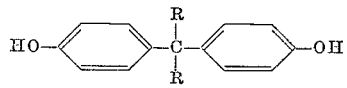

wherein R is selected from the group consisting of hydrogen, unbranched aliphatic hydrocarbon residues having up to about 10 carbon atoms, branched aliphatic hydrocarbon residues having up to about 10 carbon atoms, and cycloaliphatic residues having up to about 10 carbon atoms;

and a compound selected from the group consisting of carbonic acid alkyl di-esters, carbonic acid aryl di-esters, carbonic acid alkyl halo di-esters, phosgene, and bis-halocarbonic acid esters of dihydroxy diphenyl alkanes;

and an effective plasticizing amount of a dicarbonate ester of a dihydroxy diphenyl alkane plasticizer having the formula

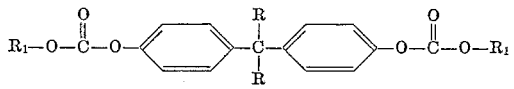

where R is said R above and $R_1$ is a radical selected from the group consisting of ethyl, butyl, ethylhexyl, and phenyl.

3. The composition of claim 1, in which the polycarbonate resin is prepared from 4,4'-dihydroxy-diphenyl-2,2-propane and diphenyl-carbonate.

4. The composition of claim 3 in which the plasticizer is the diethyl dicarbonate ester of 4,4'-dihydroxy-diphenyl-2,2-propane.

5. The composition of claim 1 in which the plasticizer is the diethyl dicarbonate ester of 4,4'-dihydroxy-diphenyl-2,2-propane.

References Cited in the file of this patent
UNITED STATES PATENTS 2,964,797    Peilstocker et al. _____ Dec. 20, 1960

FOREIGN PATENTS 772,627    Great Britain _____ Apr. 17, 1957
808,489    Great Britain _____ Feb. 4, 1959

UNITED STATES PATENT OFFICE
CERTIFICATE OF CORRECTION

Patent No. 3,117,102 January 7, 1964

Bernard F. Crowe

It is hereby certified that error appears in the above numbered patent requiring correction and that the said Letters Patent should read as corrected below.

Column 1, lines 15 to 19, after the closing bracket insert a subscript -- n --; column 3, line 44, for "exhibiting" read -- exhibited --.

Signed and sealed this 9th day of June 1964.

(SEAL)
Attest:

ERNEST W. SWIDER

Attesting Officer

EDWARD J. BRENNER

Commissioner of Patents